United States Patent [19]

Goldstein

[11] 4,175,454

[45] Nov. 27, 1979

[54] APPARATUS FOR RECOVERING PAPER IN USABLE FORM FROM A DAMAGED ROLL

[76] Inventor: David J. Goldstein, 6 Oakland St., Fall River, Mass. 02720

[21] Appl. No.: 822,406

[22] Filed: Aug. 8, 1977

[51] Int. Cl.² .................. B23B 5/14

[52] U.S. Cl. .................. 82/86; 82/101

[58] Field of Search .................. 82/86, 101, 46–48, 82/52, 53; 83/425; 242/68.7, 56.3

[56] References Cited

U.S. PATENT DOCUMENTS

| | | | |
|---|---|---|---|
| 3,446,104 | 5/1969 | Bushnell | 83/425 |
| 3,572,199 | 3/1971 | Harden | 82/101 |
| 3,661,043 | 5/1972 | Voigt | 82/101 |

FOREIGN PATENT DOCUMENTS

| | | | |
|---|---|---|---|
| 100560 | 4/1937 | Australia | 82/59 |

*Primary Examiner*—Leonidas Vlachos
*Attorney, Agent, or Firm*—Joseph Zallen

[57] ABSTRACT

An apparatus for recovering in usable form the undamaged portion of a damaged roll of paper. The roll of paper is supported on its core so as to permit unreeling. A pivotable cutting assembly is positioned so that its power driven blade cuts the undamaged portion away from the damaged portion as it is unreeled. A roller means is positioned so as to support from below the damaged portion of the roll.

4 Claims, 5 Drawing Figures

APPARATUS FOR RECOVERING PAPER IN USABLE FORM FROM A DAMAGED ROLL

BACKGROUND OF INVENTION

This invention relates to a machine for recovering paper in usable form from a damaged roll of paper. In particular, it relates to an apparatus which permits the undamaged portion of a roll of paper to be separated from the damaged portion and fed into a machine which acts on the paper, as for example, a sheeting machine.

As pointed out in U.S. Pat. No. 3,661,043, it has been a common practice in the past in obtaining narrower webs from wider webs to unwind the material from a storage reel and wind it up on a take-up reel while slitting the sheet material between the supply roll and the take-up roll. The entire roll of paper needs to be unwound, even if only a narrow portion is to be withdrawn from storage.

Various attempts to do the slitting on the supply roll by applying a blade directly to the supply roll have not been successful.

One such attempt was U.S. Pat. No. 3,446,004, which utilizes a floating beam structure carrying a knife at its end. However, this arrangement fails to provide a geometrically stable system with the result that there is edge tearing and roll collapse.

In the paper industry today there is no commercially available machine which permits the recovery and use of the undamaged portion of a roll of damaged paper.

One object of the present invention is to provide an apparatus which will permit the undamaged portion of a roll of damaged paper to be unwound and fed into a subsequent machine, as for example, a sheeting machine, rewinding machine or web printing press, while leaving the damaged portion behind on the roll.

Other objects and advantages of this invention will become apparent from the description and claims which follow taken together with the appended drawings.

SUMMARY OF INVENTION

The invention comprises generally a motor-driven cutting blade assembly mounted on the end of a vertically pivotable, rigid arm mounted on a laterally movable support. In conjunction with this pivotable arm and cutting blade assembly there is prefably a laterally and vertically adjustable roller means supported on the floor. The initial position and total cutting penetration of the cutting blade is preferably controlled by an air-operated piston near the base of the rigid, pivotable arm.

The blade assembly and roller means are used with a roll of paper in the following manner. The roll of paper is supported in a conventional fashion by a spindle on each end. The cutter assembly is positioned behind the roll of paper to make a slit so as to separate the damaged portion from the undamaged portion. Where roller means are used, they are inserted below the damaged portion of the roll of paper so as to support that portion in conjunction with the spindles.

After an initial cut has been made by hand or otherwise, a portion of the undamaged paper is unreeled and fed forwardly into a sheeting machine or the like. Further pull on this leader will cause the roll of paper to turn and simultaneously be slit by the cutter assembly. As the unwinding and slitting proceeds, the portion which was damaged, not being unwound, retains its original dimension and because it is supported by the roller means, keeps the entire roll in proper alignment with the spindles of its support. As soon as the cutting has proceeded beyond the depth of damage, as controlled by lowering the piston once the cutter assembly engages the roll of paper, the unwinding is stopped, the cutter raised away, the bulk damaged portion cut away and then the entire width of the roll is fed into the sheeting machine.

SPECIFIC EXAMPLE OF INVENTION

Figure 1:
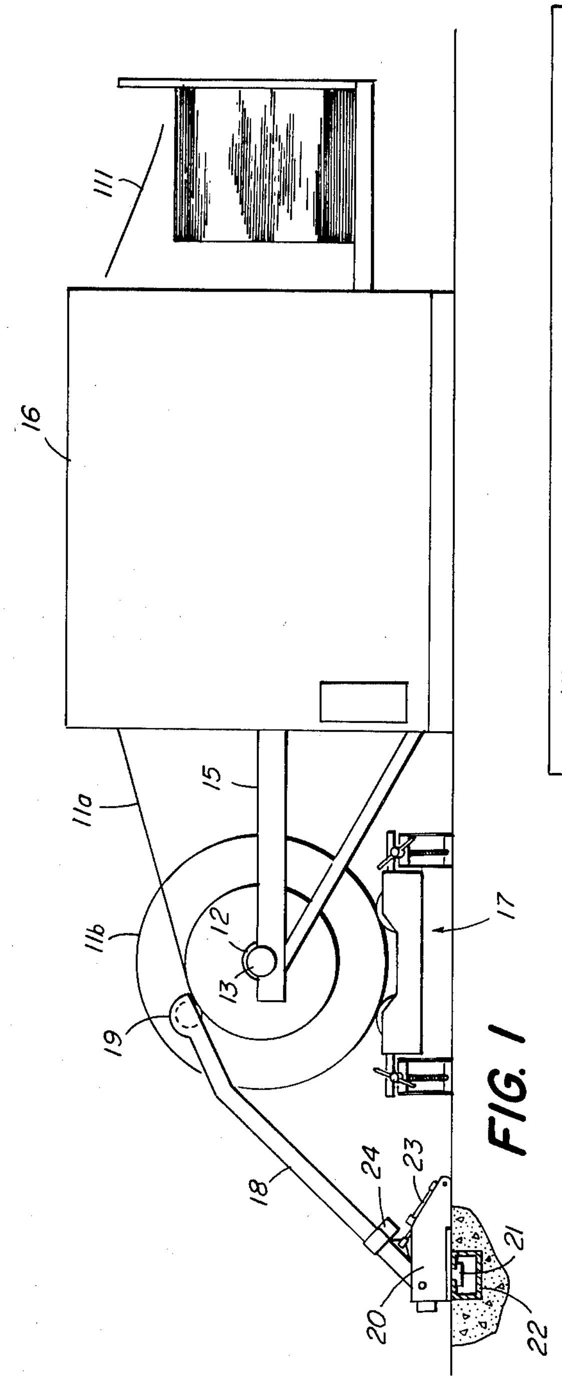
FIG. 1 is a side view of one embodiment of this invention showing the undamaged portion of a reel of paper being cut as it is unrolled and fed into a sheeting machine.
Figure 2:
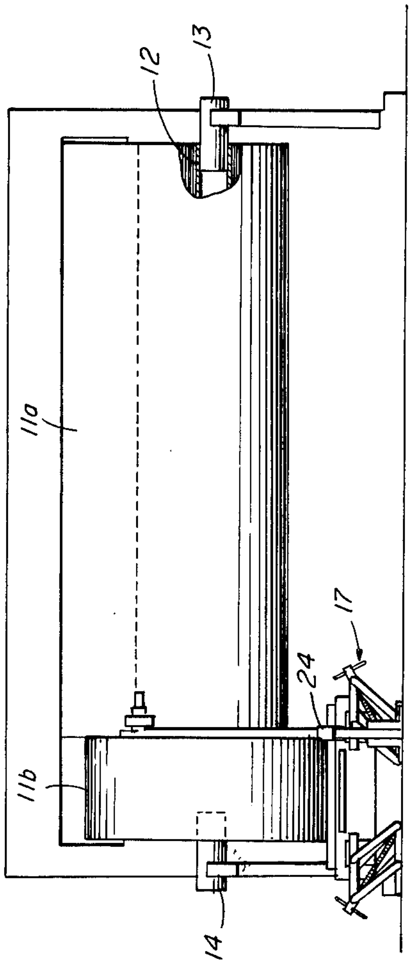
FIG. 2 is a front view.

Referring now to the drawings, there is illustrated therein a roll of paper having a portion **11*b* damaged about one-third its thickness and an undamaged portion 11*a*. The roll of paper is supported on a frame 15 by spindles 13 and 14** on either end of the normal, hollow, cylindrical, cardboard core of the roll of paper.

A laterally movable and transversely pivotable, rigid arm 18 having a cutting head 19 is positioned behind the frame in line with the separation line of the undamaged portion **11*a* from the damaged portion 11*b*. The arm 18 has a base 20 having a bottom flange 21, movable in a lateral track 22** on the floor.

The cutter head 19 comprises a rotating blade 50 supported on a bracket 54 and driven by motor 54 and shaft 56. Bracket 54 is attached to rigid arm 18 by bolts 55. Guidewheel 51, slightly narrower in diameter than the blade 50, is attached to shaft 56 by collar 52.

A vertically adjustable roller means 17 is positioned below the damaged portion **11*b* of the roll of paper and raised by jacks 37, 38, 39 and 40. Raising of the jacks causes the projections 33, 34, 35 and 36 to be raised, thus placing the rollers 30 and 31 in contact with the bottom protion of the damaged portion 11*b*** of the roll of paper.

Figure 3:
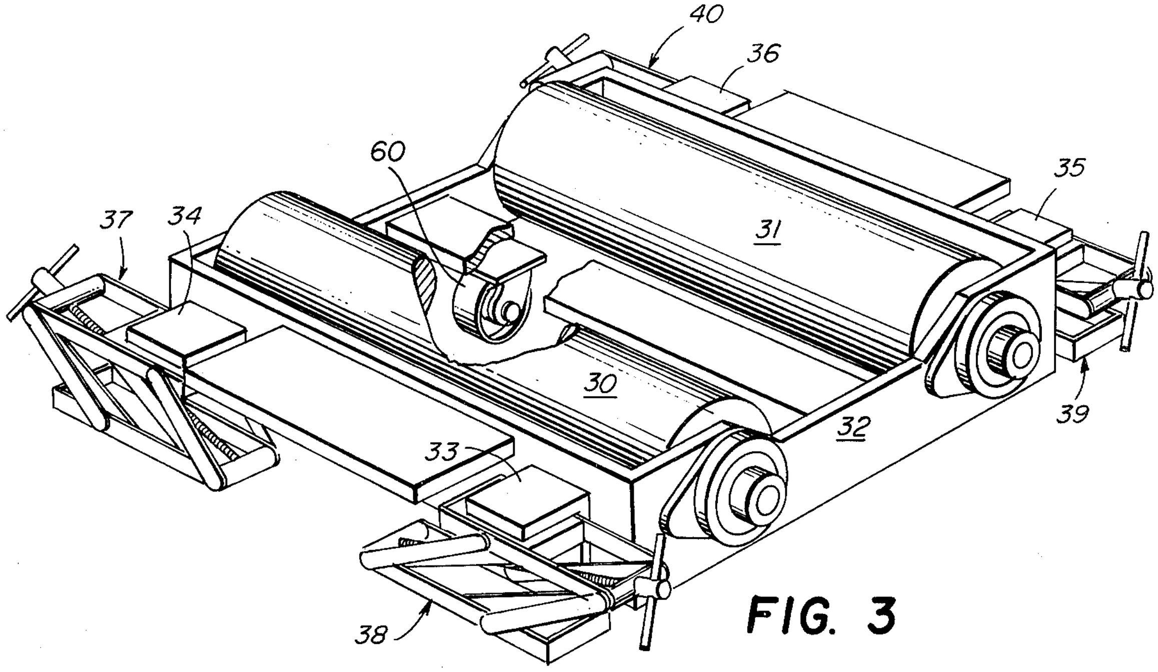
FIG. 3 is a perspective view of the rollers which engage the undamaged portion of the roll of paper.
Figure 4A:
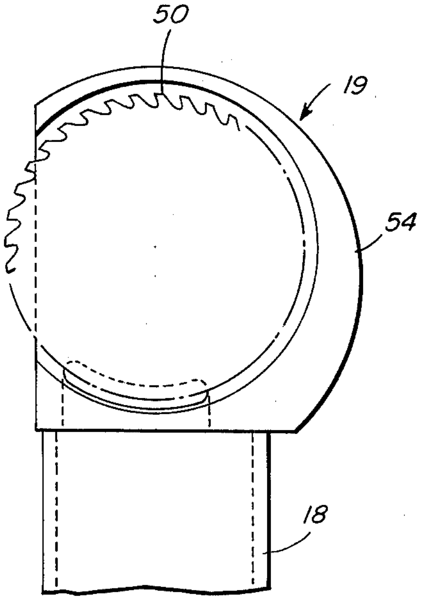
FIG. 4*a* is an enlarged, partial side view of the cutter which slits the paper.
Figure 4B:
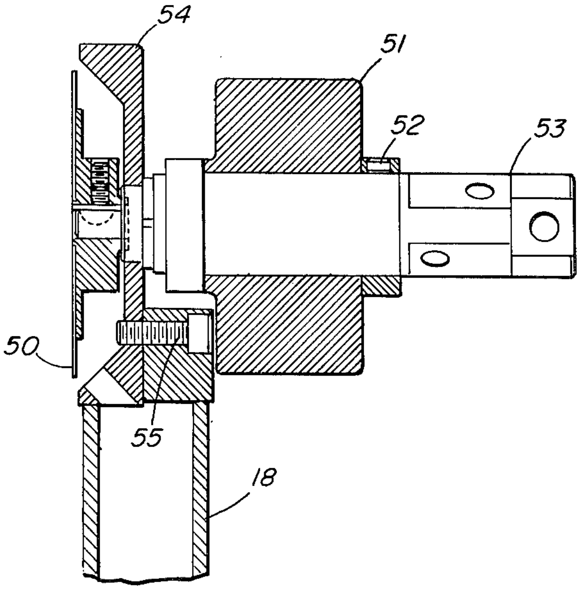
FIG. 4*b* is a section along line 4*b*—4*b* of FIG. 4*a*.

The undamaged paper **11*a* is unreeled and cut away from the damaged paper 11*b* by the cutter head 19 with its power-driven cutting blade 50 and fed into sheeting machine 16 which cuts and stacks sheets 111. The arm 18 and attachments are counter balanced so that once the lateral positioning of the cutter assembly 19 and roller means 17 by means of casters 60 (see. FIG. 3) have been made, paper 11*a*** can be unreeled without further adjustments.

The motor 53 is air-operated although it can be electrically or hydraulically operated. Similarly, the vertical adjustment piston 23 is air-operated, but can also be electrically or hydraulically operated.

I claim:

1. An apparatus for recovering in usable form the undamaged portion of a damaged roll of paper comprising in combination:

(a) unwinding means (15) for supporting a damaged roll of paper on its axial core so as to permit unreeling forwardly;

(b) a support means (20) spaced rearwardly of said unwinding means (15) and positionable along said roll axially thereof;

(c) a rigid arm (18) pivotally mounted on said support means (20);

(d) cutting means (19) attached to said rigid arm (18) and provided with a motor means (53);

(e) piston means (23) for selectively raising and lowering said rigid arm (18) for positioning said cutting means (19) adjacent the point at which the paper is unreeled from the undamaged portion of said roll; and, (f) roller means (17) having rollers (30) and means (37) to adjust said rollers vertically at a fixed adjustable position and means (60) permitting adjustable positioning of said rollers axially along said roll to support the damaged portion of the roll from beneath while the undamaged portion is unreeled to stabilize said roll during unreeling;

said apparatus being so arranged so that said cutting means cuts said roll of said paper as it is unreeled to the selected depth so that what is unreeled is the undamaged portion, the damaged portion remaining on the unwinding means (15).

2. The apparatus of claim 1 wherein said motor means (53) and said piston means (23) are operated by air pressure.

3. The apparatus of claim 1 wherein a roller (51) of slightly less diameter than the blade of the cutting means is provided on said cutting means to keep the blade in stable position during its cutting operation.

4. The apparatus of claim 1 wherein said support means (20) is positionable by being horizontally slidable on a track.

* * * * *